United States Patent [19]

Scott et al.

[11] 4,348,641

[45] Sep. 7, 1982

[54] DIGITAL BASEBAND CARRIER RECOVERY CIRCUIT

[75] Inventors: Lex A. Scott, Huntsville, Ala.; William H. Mosley, Jr., St. Petersburg; Carl F. Andren, Indiatlantic, both of Fla.

[73] Assignee: E-Systems, Inc., Dallas, Tex.

[21] Appl. No.: 110,462

[22] Filed: Jan. 8, 1980

[51] Int. Cl.³ .................. H03D 3/00; H03K 9/00
[52] U.S. Cl. .................................. 329/50; 329/124; 375/94
[58] Field of Search .............. 329/50, 122, 124, 126; 375/83-87, 94, 118; 455/258, 260, 265, 208; 331/12

[56] References Cited

U.S. PATENT DOCUMENTS

| | | | |
|---|---|---|---|
| 3,101,448 | 8/1963 | Costas | 329/50 |
| 3,204,185 | 8/1965 | Robinson | |
| 3,368,036 | 2/1968 | Carter et al. | 375/85 |
| 3,403,355 | 9/1968 | Takada | |
| 3,500,217 | 3/1970 | Allen | 329/50 |
| 3,568,067 | 3/1971 | Williford | 329/124 X |
| 3,745,255 | 7/1973 | Fletcher | 329/122 X |
| 3,768,030 | 10/1973 | Brown et al. | 329/122 X |
| 3,787,775 | 1/1974 | Lanning | 329/122 |
| 3,789,316 | 1/1974 | Goetz et al. | 329/124 X |
| 3,893,039 | 7/1975 | Yang et al. | |
| 3,993,956 | 11/1976 | Gilmore et al. | 375/84 |
| 4,057,762 | 11/1977 | Namiki | 329/50 |
| 4,085,378 | 4/1978 | Ryan et al. | 329/124 |

*Primary Examiner*—Siegfried H. Grimm
*Assistant Examiner*—Edward P. Westin
*Attorney, Agent, or Firm*—Robert V. Wilder; Albert M. Crowder, Jr.

[57] ABSTRACT

A recovery loop includes an analog circuit that mixes a fixed frequency signal from a temperature controlled oscillator (20) with an IF input to produce product signals corresponding to the quadrature components of data signals with frequency offset. A digital complex multiplier (32) is responsive to the product signals and to the output of a number controlled oscillator (34) to produce a digital output corresponding to the data signals. The output of the number controlled oscillator (34) is controlled by a digital phase lock loop.

18 Claims, 6 Drawing Figures

DIGITAL BASEBAND CARRIER RECOVERY CIRCUIT

TECHNICAL FIELD

The present invention relates to carrier recovery loops for use in a demodulator, and particularly relates to a carrier recovery loop for digital implementation at baseband frequencies.

BACKGROUND OF INVENTION

Many types of carrier recovery loops for demodulating an incoming signal are well-known in the art. In one type of conventional loop, known as a Costas type loop, a local oscillator is used to remove the carrier frequency from the incoming signal. Typically, the signal from the local oscillator is mixed with the incoming signal to produce one channel signal, and the local oscillator signal is phase shifted by 90° and is mixed with the incoming signal to produce a second channel signal. The two channel signals are then applied to a feedback loop that locks the local oscillator in synchronism with the incoming carrier frequency. The mixing of this local oscillator signal and the incoming signal will remove the carrier frequency from the incoming signal. In this manner, the local oscillator is used to demodulate the incoming signal. It will be appreciated that the local oscillator in a Costas type loop must produce varying frequencies in order to follow the frequency drift of the incoming signal.

Because of the high data rate or frequency at which the Costas type loop must operate, it is not well suited for digital implementation. Therefore, a need has arisen for a carrier recovery loop for replacing a Costas type loop that is amenable to digital implementation. Specifically, a need has arisen for a recovery loop that may be implemented digitally without the problems associated with digitally implementing a recovery loop at high frequencies at which Costas loops are normally operated.

Analog demodulators often suffer from problems peculiar to analog devices such as D.C. offset and voltage controlled oscillator drift. A need has arisen for a digitally implemented recovery loop to overcome such problems. Furthermore, analog demodulators are not flexible for being adapted to varying data rates and different forms of demodulation. With a digital recovery loop, loop parameters may be changed by software modifications to allow operation at different data rates and forms of modulation such as phase shift keying and frequency shift keying. In addition, digital demodulation circuitry may be miniaturized using integrated circuits.

SUMMARY OF THE INVENTION

In accordance with the present invention, a recovery loop demodulates a received data modulated signal to produce a data signal at a base band frequency. An analog circuit receives the data modulated signal and produces analog output signals corresponding to the data signals with a frequency offset component. The analog output signals are produced at approximately the baseband frequency. A processing circuit is responsive to the analog output signals to remove the frequency offset component to produce the data signal in digital form.

In accordance with an embodiment of the present invention, the processing circuit is a digital processing circuit that includes a digital complex multiplier in which the data signal with a frequency offset component is multiplied by a first complex number. The first complex number represents positive or negative frequencies, and the complex multiplication is operable to cancel or remove the frequency offset to produce a complex product in digital form which corresponds to the data signal.

In accordance with a particular embodiment of the invention, the analog circuit includes a splitter for splitting the received data modulated signal into first and second channels. A local oscillator produces a fixed frequency signal at a frequency approximately a design center frequency of the carrier signal of the data modulated signal, and a 90° phase shifter is responsive to the fixed frequency signal to produce a 90° phase shifted fixed frequency signal. A first analog mixer mixes the first channel signal with the 90° phase shifted fixed frequency signal to produce a first product signal. A second analog mixer mixes the second channel signal with the fixed frequency signal to produce a second product signal. The first and second product signals constitute the analog output signals that are applied to the processing circuit previously described.

BRIEF DESCRIPTION OF THE DRAWINGS

The present invention may be more fully understood by those of ordinary skill in the art by reference to the following Detailed Description when considered in conjunction with the Drawings in which.

DETAILED DESCRIPTION

Figure 1:
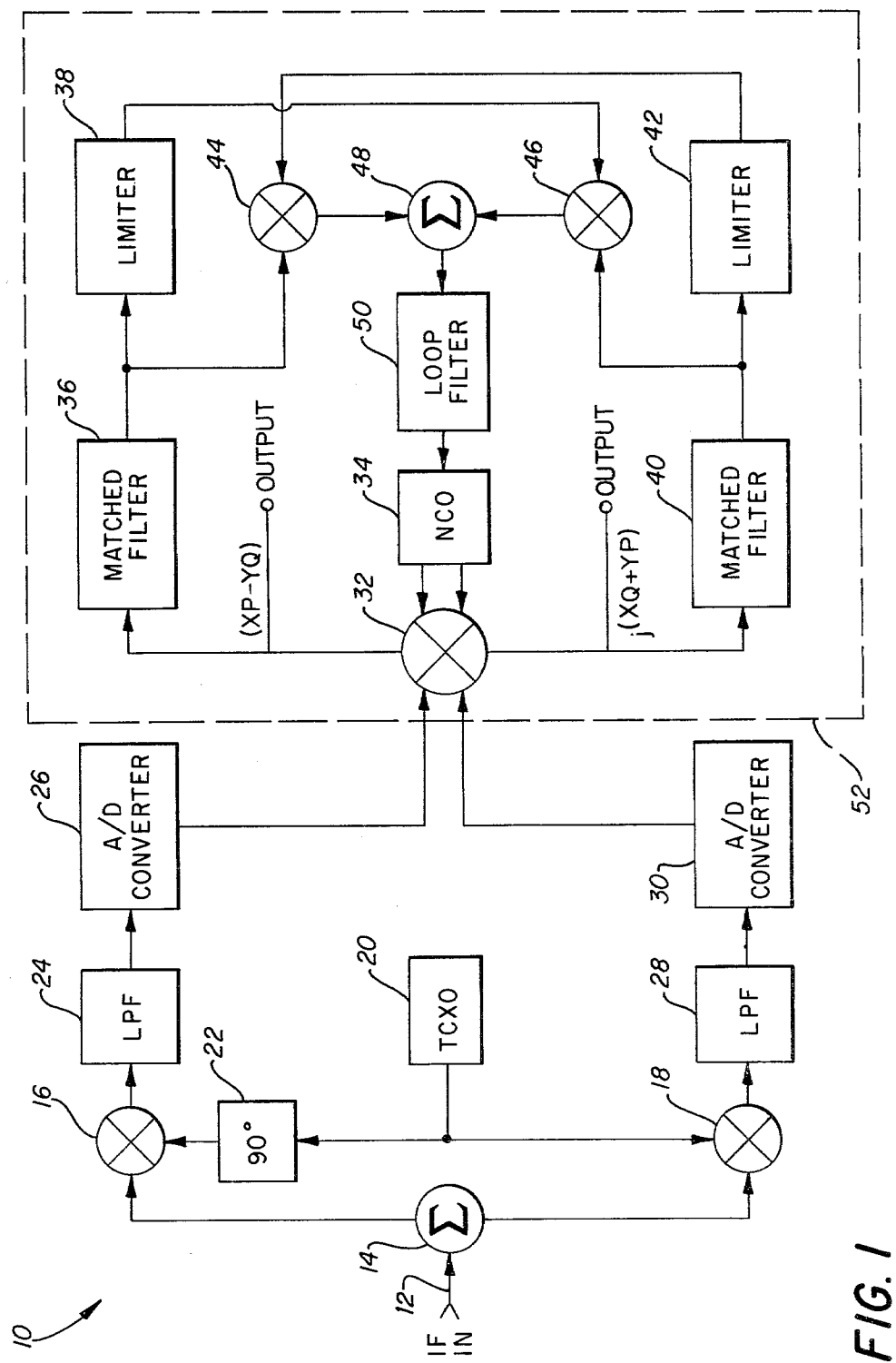
FIG. 1 is a block diagram of a recovery loop embodying the present invention in which a temperature controlled oscillator and a digital complex multiplier are used to demodulate an incoming IF signal.

Referring now to the Drawings in which like reference characters designate like or corresponding parts throughout the several views, there is shown in FIG. 1 a recovery loop 10 embodying the present invention. An incoming intermediate frequency data modulated signal (IF signal) is applied to the recovery loop 10 on line 12. The IF signal includes an IF carrier signal component having a design center frequency and also includes a data signal. A splitter 14 receives the IF signal and splits the signal into two channels. One channel signal is applied to a mixer 16 and the other channel signal is applied to a mixer 18. Mixers 16 and 18 are conventional analog mixers such as double balanced diode mixers.

A temperature controlled oscillator 20 produces a fixed frequency signal at the design center frequency. The fixed frequency signal of the oscillator 20 is applied directly to the mixer 18 and is also applied to a 90° phase shifter 22. The output of the 90° phase shifter 22 is then applied to the mixer 16.

The outputs of the mixers 16 and 18 constitute the quadrature components of the data signal with a frequency offset. Although the oscillator 20 is designed to produce a fixed frequency at the design center frequency of the IF carrier signal, there is no provision for locking the output of the temperature controlled oscillator 20 to the IF carrier signal. Thus, there exists a frequency offset between the output of the oscillator 20 and the IF carrier signal.

In addition to the data signal with a frequency offset, the outputs of the mixers 16 and 18 include a high frequency component that is produced by the conventional mixers 16 and 18. Thus, the output of mixer 16 is applied through a low pass filter 24 to remove the high frequency component, and the output of the low pass filter 24 is applied to an analog-to-digital converter 26. Likewise, the output of the mixer 18 is applied to a low pass filter 28 to remove the high frequency component, and the output of the low pass filter 28 is applied to an analog-to-digital converter 30.

The outputs of the analog-to-digital converters 26 and 30 are digital representations of the data signal with the frequency offset. A digital complex multiplier 32 receives the output signals from the analog to digital converters 26 and 30, and multiplies such signals by a digital input received from a number controlled oscillator 34. The number controlled oscillator 34 is operable to produce signals representing both positive and negative frequencies. When the output from the number controlled oscillator 34 is multiplied by the quadrature components of the data signals with the frequency offset in the complex multiplier 32, the frequency offset is removed and the output of the complex multiplier 32 represents the quadrature components of the data signals in digital form.

One output of the multiplier 32 is applied through a matched filter 36 whose output is applied to a limiter 38. The other output of the multiplier 32 is applied to a matched filter 40 whose output is applied to a limiter 42. The output of the matched filter 36 is applied to a digital mixer 44, and the other input of the digital mixer 44 is connected to the output of the limiter 42. The output of the matched filter 40 is also applied to a mixer 46, and the remaining input of the mixer 46 is connected to the output of the limiter 38.

The outputs of the mixers 44 and 46 are applied to a summer 48 that digitally sums the two signals and provides a summation signal to the input of a loop filter 50. The output of the loop filter 50 is a control signal that is applied to the number control oscillator 34. In this manner, the number control oscillator 34 is locked or synchronized with the frequency offset that appears in the outputs of the analog-to-digital converters 26 and 30. The matched filters 36 and 40, the limiters 38 and 42, the mixers 44 and 46, the summer 48 and the loop filter 50 form a feedback loop or a phase lock loop for controlling the number control oscillator 34.

In operation, the function of the temperature control oscillator 20 is to convert the frequency of the incoming IF signal on line 12 to a baseband frequency so that subsequent demodulation may be performed digitally at the lower baseband frequency. After the incoming IF signal is mixed in mixers 16 and 18 and low pass filtered in filters 24 and 28, the output of the low pass filters 24 and 28 constitutes the quadrature components of the data signals with a frequency offset. As used herein, the phrase "frequency offset" will be understood to include an arbitrary phase offset between the incoming IF carrier signal and the fixed frequency signal from the temperature control oscillator 20.

The quadrature components produced at the output of the low pass filters 24 and 28 may be considered to be the components of a signal whose equation is:

$$e^{j(\omega_o t + \theta_o + \theta_m)}$$

where $\omega_o$ = The deviation in frequency between the incoming IF carrier signal and the fixed frequency signal of the temperature control oscillator 20 caused by offsets in the IF signal such as doppler shifts.

$\omega_o$ = An arbitrary phase offset between the incoming IF carrier signal and the fixed frequency signal of the oscillator 20.

$\theta_m$ = The phase shift keying phase modulation.

The outputs of the number control oscillator 34 may be considered to be the components of a signal whose equation is:

$$e^{-j(\omega_o t + \theta_o)}.$$

The complex multiplier then performs the operation:

$$e^{j(\omega_o t + \theta_o + \theta_m)} \cdot e^{-j(\omega_o t + \theta_o)}.$$

This multiplication gives the result $e^{j\theta_m}$. Thus, the result of the multiplication results in a data signal including only the phase shift keying phase modulation.

As will be hereinafter described in more detail, the multiplication in the complex multiplier 32 is done in the rectangular domain rather than the polar domain for convenience in processing. The quadrature components of the signal $e^{j(\omega_o t + \theta_o + \theta_m)}$ may be represented as $\cos(\omega_o t + \theta_o + \theta_m) + j \sin(\omega_o t + \theta_o + \theta_m)$ which may be simply represented as $x + jy$, where x and y represent the outputs of the analog-to-digital converters 26 and 30. Where P and Q represent the outputs of the number control oscillator 34, the multiplication performed by the complex multiplier 32 may be represented as: $(X + jY)(P + jQ) = (XP - YQ) + j(XQ + PY)$.

In the preferred embodiment, all of the circuitry within the dotted line 52 is implemented digitally. Since the complex multiplier 32 must perform complicated multiplications at a relatively high speed, the multiplier is implemented as discrete $T^2L$ logic, and the remainder of the circuitry within the dotted line may be implemented as hardware, firmware or software in a computer.

Figure 2:
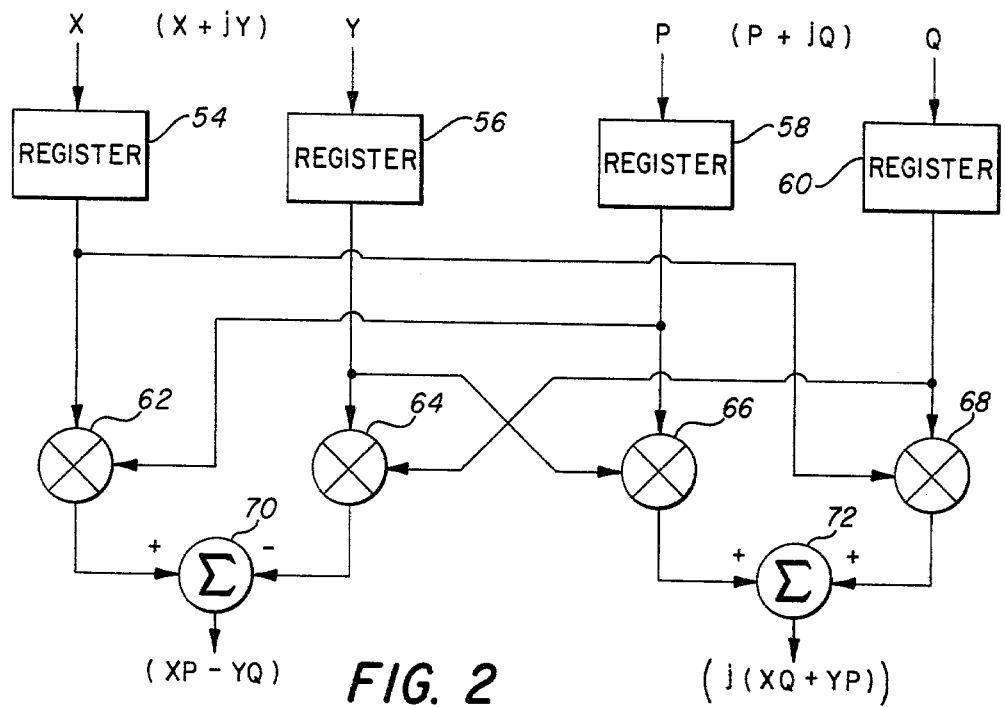
FIG. 2 is a diagram of the complex multiplier used in the present invention.

A block diagram of the complex multiplier 32 is shown in FIG. 2. Registers 54 and 56 receive inputs X and Y, respectively, which are digital numbers representing the quadrature components produced at the outputs of the analog-to-digital converters 26 and 30. Registers 58 and 60 receive inputs P and Q which represent the quadrature components produced at the outputs of the number control oscillator 34. The outputs of registers 54, 56, 58 and 60 correspond to their inputs and are used to perform complex multiplication.

A mixer 62 receives the output from registers 54 and 58. A mixer 64 receives inputs from the outputs of registers 56 and 60. A mixer 66 receives inputs from the outputs of registers 56 and 58. Finally, a mixer 68 receives inputs from the outputs of registers 54 and 60.

The output from the mixer 64 is subtracted from the output of the mixer 62 in a subtractor 70. Thus, the output of the subtractor 70 represents the operation (XP-YQ).

The outputs of the mixers 66 and 68 are added together in a summer 72, so that the output of the summer 72 represents the operation (j)(XQ+YP)). Thus, the outputs of the subtractor 70 and the summer 72 represent the complex number, (XP-YQ)+j (XQ+YP). As previously described, this complex number is the data signal which includes the phase shift keying modulation.

Figure 3:
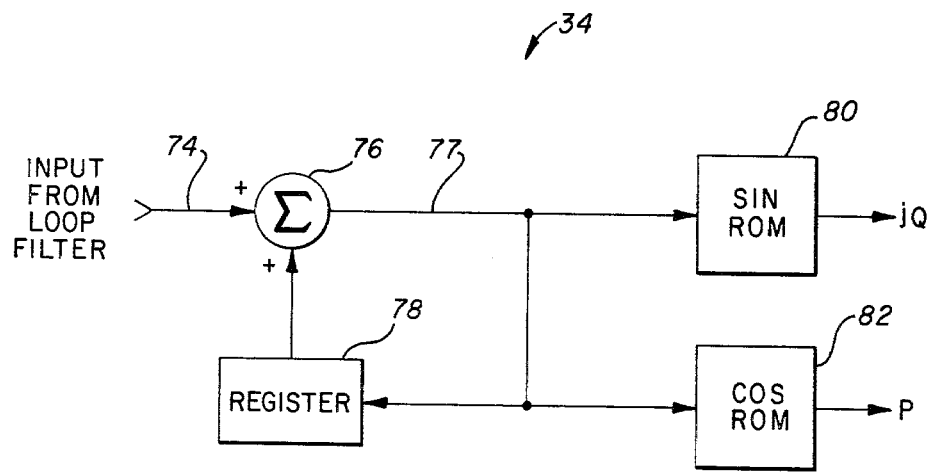
FIG. 3 is a block diagram of a complex number controlled oscillator used in the present invention for providing an input to the complex multiplier.

Referring now to FIG. 3, there is shown a block diagram of the number control oscillator 34. An input signal is received on line 74 from the loop filter 50 (FIG. 1). The input signal is applied to a summer 76 that receives a second input from a register 78. The summer 76 sums its two inputs and produces an output signal on line 77. The output signal on line 77 is applied back to the register 78 and is also applied to select an address in read only memories 80 and 82.

Data has been loaded into the memories 80 and 82 so that the read only memory 80 produces the sine of the desired output frequency as determined by the input signal on line 74, and the read only memory 82 produces the cosine of the desired output frequency. Thus, the output of the read only memory 80 corresponds to jQ and the output of the read only memory 82 corresponds to P as used above. The sum, P+jQ, is the complex number used in the complex multiplication in the multiplier 32 to demodulate or to remove the frequency offset from the outputs of the analog-to-digital converters 26 and 30.

Figure 4:
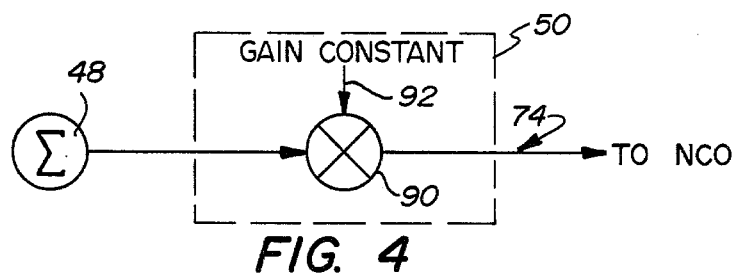
FIG. 4 shows a multiplier used as a loop filter having a first order frequency response.
Figure 5A:
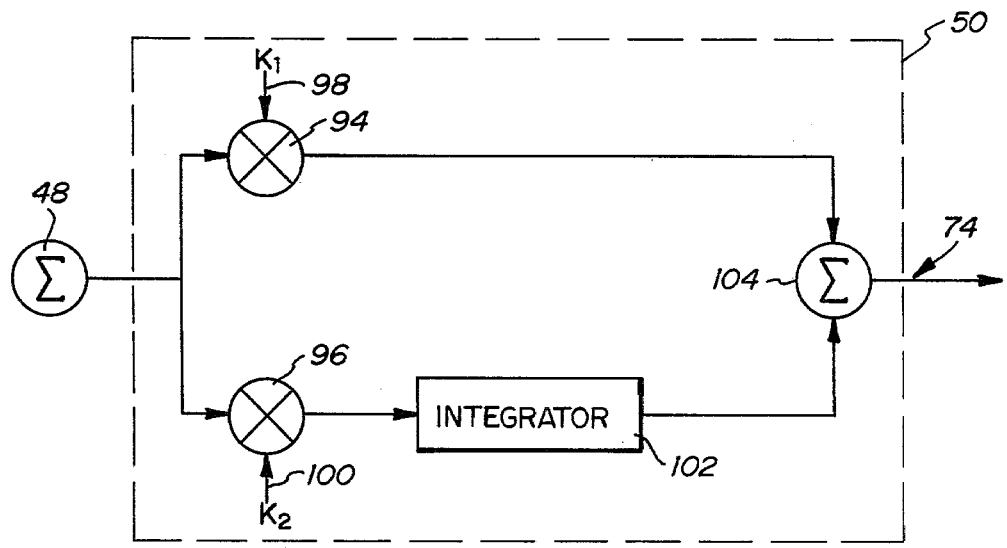
FIGS. 5a and 5b show alternate loop filters having a second order frequency response.
Figure 5B:
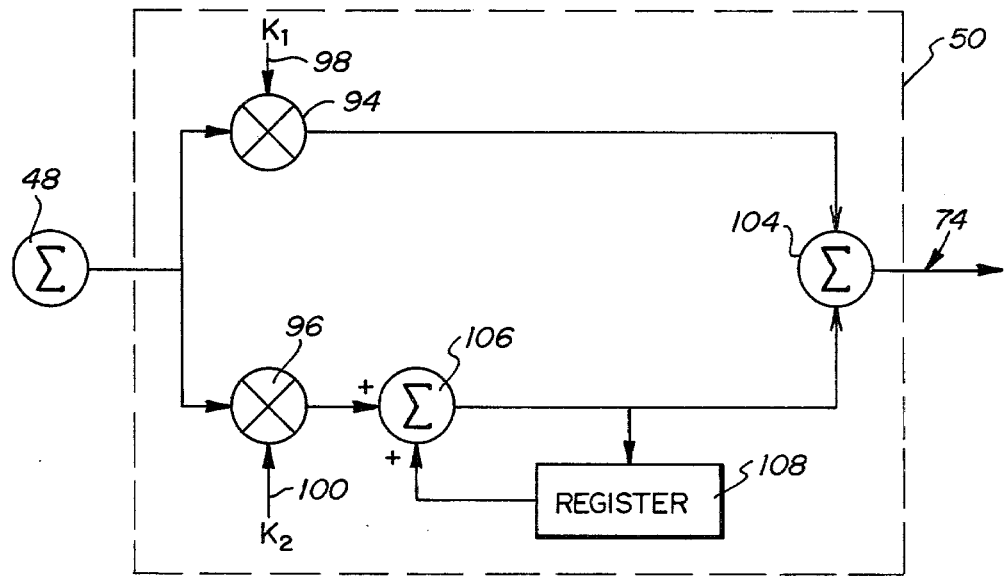

Two possible though not exhaustive implementations of loop filter 50 (FIG. 1) are shown in FIGS. 4, 5a and 5b. In FIG. 4, a digital multiplier 90 is provided as the loop filter 50. The output of summer 48 is applied to one input of mixer 90 and a constant or variable gain signal is applied on line 92 to the other input. Thus, mixer 90 is a gain block providing a first order loop frequency response. Since the bandwidth of a first order loop is proportional to the total loop gain, the bandwidth may be varied by changing the gain signal on line 92.

In FIG. 5A, a second order loop frequency implementation of loop filter 50 is shown. In this embodiment, the output of summer 48 is applied to inputs of mixers 94 and 96. Gain constants $K_1$ and $K_2$ are applied, respectively, to the remaining inputs of mixers 94 and 96. The output of mixer 96 is applied to an integrator 102 for cummulatively integrating the output of the mixer 96, and the outputs of the integrator 102 and the mixer 94 are applied to a summer 104 that produces the output of the loop filter 50 on line 74.

The embodiment shown in FIG. 5b is an example of a digital implementation of the filter shown in FIG. 5a. The circuitry of FIG. 5b includes a summer 106 connected to the output of the mixer 96. The output of summer 106 is fed back through a register 108 to the remaining input of the summer 106. In this manner, the previous output of summer 106 is used in forming a new output. The summer 106 and register 108 function as a digital integrator. The output of the summer 106 is connected to an input of the summer 104. The remaining input of the summer 104 is connected to the mixer 94 as in the circuitry shown in FIG. 5a.

The constants, $K_1$ and $K_2$, are supplied respectively to mixers 94 and 96 on lines 98 and 100. These constants set the loop natural frequency and the damping factor in accordance with the following equations:

$$K_1 = 2\xi\omega\eta/K_T$$

and $$K_2 = \omega\eta^2/K_T$$

where:
 $\xi$(zeta) is the desired loop damping factor;
 $\omega\eta$ is the desired loop frequency in radian frequency; and
 $K_T$ is the total loop gain.

Although a particular embodiment has been described in the foregoing Detailed Description, it will be understood that the invention is capable of numerous rearrangements, modifications and substitution of parts without departing from the spirit of the invention. In particular, although phase shift keying modulation was discussed in association with the above-described embodiment, it will be understood that the present invention may be implemented using other forms of modulation.

We claim:

1. A circuit for demodulating a data modulated signal that includes a data signal and a carrier signal having a design center frequency, comprising:
    a fixed frequency oscillator for producing an oscillator signal at the design center frequency with a frequency offset existing between the oscillator signal and the carrier signal;
    first mixing means for mixing the data modulated signal with the oscillator signal phase shifted by 90 degrees to produce a first product signal;
    second mixing means for mixing the data modulated signal with the oscillator signal to produce a second product signal;
    said first and second product signals being the quadrature components of the data signal and the frequency offset existing between the oscillator signal and the data modulated signal;
    processing means responsive to the first and second product signals for producing a complex number signal; and
    said processing means operative to combine the first and second product signals and the complex number signal for removing the frequency offset to produce the data signal.

2. The circuit of claim 1 wherein said processing means comprises a digital means for producing the data signals.

3. A recovery circuit for demodulating a data modulated signal that includes a data signal and a carrier signal having a design center frequency, comprising:
    a fixed frequency oscillator for producing an oscillator signal at the design center frequency with a frequency offset existing between the oscillator signal and the carrier signal;
    first mixing means for mixing the data modulated signal with the oscillator signal phase shifted by 90° to produce a first product signal;
    second mixing means for mixing the data modulated signal with the oscillator signal to produce a second product signal;
    said first and second product signals being the quadrature components of the data signal and the frequency offset existing between the oscillator signal and the data modulated signal;
    a digital complex multiplier responsive to the first and second product signals for performing vector multiplication using positive and negative frequencies to remove the frequency offset to produce the data signal; and a phase lock loop for receiving the data signal and for supplying an input signal to said complex multiplier, said input signal being a first complex number and being multiplied with a second complex number formed from the first and second product signals to produce the data signals.

4. The circuit of claim 3 wherein said phase lock loop comprises:

loop means responsive to the data signal for producing a control number; and a number controlled oscillator responsive to said control number for producing the input signal, said number controlled oscillator being operable to produce positive and negative complex numbers for use in the complex multiplier.

5. A circuit for demodulating a received data modulated signal that includes a data signal and a carrier signal having a design center frequency, comprising:

analog means for receiving the data modulated signal, said analog means producing first and second analog output signals corresponding to the data signals with a frequency offset component, the analog output signals being produced at approximately the baseband frequency of the data signal;

analog-to-digital converter means for converting the analog output signals to a pair of digital inputs that correspond to the quadrature components of the data signal with a frequency offset component;

first and second registers, each receiving one of the digital inputs and producing an output;

third and fourth registers, each receiving a control input and producing an output;

a first mixer responsive to the outputs of said first and third registers to produce a first mixer output;

a second mixer responsive to the outputs of said second and fourth registers to produce a second mixer output;

a third mixer responsive to the outputs of said second and third registers to produce a third mixer output;

a fourth mixer responsive to the outputs of said first and fourth registers to produce a fourth mixer output;

a subtractor for subtracting the second mixer output from the first mixer output to produce a subtraction output;

an adder for adding the third and fourth mixer outputs to produce an addition output; and a feedback loop responsive to the subtraction output and the addition output to produce the control inputs, whereby the subtraction output and the addition output represent a complex number corresponding to the data signal, the complex number being the result of a complex multiplication of the digital inputs by the control inputs to remove the frequency offset component.

6. A circuit for demodulating a received data modulated signal that includes a data signal and a carrier signal having a design center frequency, comprising:

analog means for receiving the data modulated signal, said analog means producing first and second analog output signals corresponding to the data signals with a frequency offset component, the analog output signals being produced at approximately the baseband frequency of the data signal;

a digital complex multiplier responsive to the analog output signals for performing complex multiplication using positive and negative frequencies to produce a digital output corresponding to the data signal with the frequency offset removed; and a phase lock loop for receiving the digital output and for supplying an input signal to said complex multiplier, said input signal being a first complex number representing positive and negative frequencies and being multiplied by a second complex number representing the data signal with the frequency offset to produce a complex product in digital form representing the data signal.

7. The circuit of claim 6 wherein said phase lock loop comprises:

loop means responsive to the digital output for producing a control number; and a number controlled oscillator responsive to said control number for producing the input signal, said number controlled oscillator being operable to produce positive and negative complex numbers for use in the complex multiplier.

8. A circuit for demodulating a received data modulated signal that includes a data signal and a carrier signal having a design center frequency, comprising:

analog means for receiving the data modulated signal, said analog means producing first and second analog output signals corresponding to the data signals with a frequency offset component, the analog output signals being produced at approximately the baseband frequency of the data signal;

first and second analog-to-digital converters each responsive to one of the analog output signals for producing first and second digital inputs, said digital inputs corresponding to the data signal with a frequency offset component;

a complex multiplier for producing first and second product signals in response to the first and second digital inputs, said first and second product signals corresponding to the quadrature components of the data signals with the frequency offset removed;

a first digital filter responsive to the first product signal for producing a first filtered signal;

a second digital filter responsive to the second product signal for producing a second filtered signal;

a first limiter responsive to the first filtered signal for producing a first limiter signal;

a second limiter responsive to the second filtered signal for producing a second limiter signal;

a first digital mixer for mixing the first filtered signal and the second limiter signal to produce a first digital mixer signal;

a second digital mixer for mixing the second filtered signal and the first limiter signal to produce a second digital mixer signal;

a summer for summing the first and second digital mixer signals to produce a summation signal;

a loop filter for producing a control number in response to the summation signal;

a number controlled oscillator for producing first and second oscillator outputs in response to the control number; and said complex multiplier being operable to multiply the first oscillator output by the first digital input to produce the first product signal and being operable to multiply the second oscillator output by the second digital input to produce the second product signal.

9. The circuit of claim 8 wherein said analog means comprises:

a splitter for splitting the received data modulated signal into first and second channel signals;

a local oscillator for producing a fixed frequency signal at a frequency approximating the design center frequency of the data modulated signal;

a 90° phase shifter receiving the fixed frequency signal and producing a 90° phase shifted fixed frequency signal;

a first analog mixer for mixing the first channel signal with a 90° phase shifted fixed frequency signal to produce a first analog mixer signal;

a second analog mixer for mixing the second channel signal with the fixed frequency signal to produce a second analog mixer signal; and said first and second analog mixer signals being the analog output signals.

10. A method for demodulating a received data modulated signal that includes a data signal and a carrier signal comprising:

mixing the received data modulated signal with a fixed frequency signal to produce at least one product signal corresponding to the data signal with a frequency offset component;

converting the product signal into a complex digital input corresponding to the data signal with a frequency offset; and digitally multiplying the complex digitial input by a complex number for removing the frequency offset to produce a digital data signal corresponding to the data signal.

11. The method of claim 10 further comprising controlling selection of the complex number with a digital feedback loop responding to the digital data signal.

12. A circuit for demodulating a received data modulated signal that includes a data signal and a carrier signal having a design center frequency, comprising:

analog means for receiving the data modulated signal, said analog means producing first and second analog output signals corresponding to the data signals with a frequency offset component, the analog output signals being produced at approximately the baseband frequency of the data signal;

analog-to-digital converter means responsive to the analog output signals for producing a digital input corresponding to the data signal with a frequency offset component;

a complex multiplier for producing a complex number in response to the digital input and a control input, the complex number corresponding to the data signal with the frequency offset removed;

a feedback loop for producing a control number in response to the complex number; and a number controlled oscillator for producing the control input in response to the control number.

13. The circuit of claim 12 wherein said feedback loop further comprises a loop filter having a first order frequency response.

14. The circuit of claim 13 wherein said loop filter comprises a digital multiplier for multiplying an input signal by a gain signal.

15. The circuit of claim 12 wherein said feedback loop further comprises a loop filter having a second order frequency response.

16. The circuit of claim 15 wherein said loop filter comprises:

a first multiplier for multiplying an input signal by a first gain signal;

a second multiplier for multiplying an input signal by a second gain signal;

an integrator for cummulatively integrating the output of the second multiplier; and a summer for summing the outputs of the first multiplier and the integrator to produce a loop filter signal.

17. The circuit of claim 16 wherein said integrator comprises:

a digital summer for receiving the output of said second multiplier; and a register connected to the output and an input of said digital summer to feed the previous output of the digital summer back to the digital summer for use in forming a new summer output.

18. The circuit of claim 12 wherein said number controlled oscillator comprises:

an adder responsive to the control number and a register output to produce an addition output;

a register connected to receive the adder output for producing the register output;

a first memory for producing an imaginary output corresponding to the sine of the addition output; and a second memory for producing a real output corresponding to the cosine of the addition output.

* * * * *